United States Patent [19]

Günter

[11] Patent Number: 4,996,429
[45] Date of Patent: Feb. 26, 1991

[54] POCKET MEASURING INSTRUMENT FOR MEASURING IONIZING RADIATION

[75] Inventor: Werthmann Günter, Hemer, Fed. Rep. of Germany

[73] Assignee: Nokia Unterhaltungselektronik, Pforzheim, Fed. Rep. of Germany

[21] Appl. No.: 429,563

[22] Filed: Oct. 31, 1989

[30] Foreign Application Priority Data

Nov. 8, 1988 [DE] Fed. Rep. of Germany ... 8813940[U]

[51] Int. Cl.$^5$ ............................................... G01T 1/16
[52] U.S. Cl. .......................... 250/336.1; 250/370.01; 250/374; 250/388
[58] Field of Search ........................ D10/47; D24/23; 250/388, 374, 370.07, 370.06, 370.01, 336.1

[56] References Cited

U.S. PATENT DOCUMENTS 4,243,885  1/1981  Agouridis et al. ............ 250/370.07

FOREIGN PATENT DOCUMENTS 645732  10/1984  Switzerland ..................... 250/388

Primary Examiner—Constantine Hannaher
Attorney, Agent, or Firm—Peter C. Van Der Sluys

[57] ABSTRACT

An instrument for measuring ionization radiation acting upon a person is mounted in a housing which can be carried in the pocket of a garment, the housing includes a forwardly projecting portion having a radiation detector mounted in the forwardmost portion thereof, so as to be exposed to a wide angle of ionizing radiation. A display unit is located in an upper wall of the housing facing in a direction which may be read by the person.

2 Claims, 1 Drawing Sheet

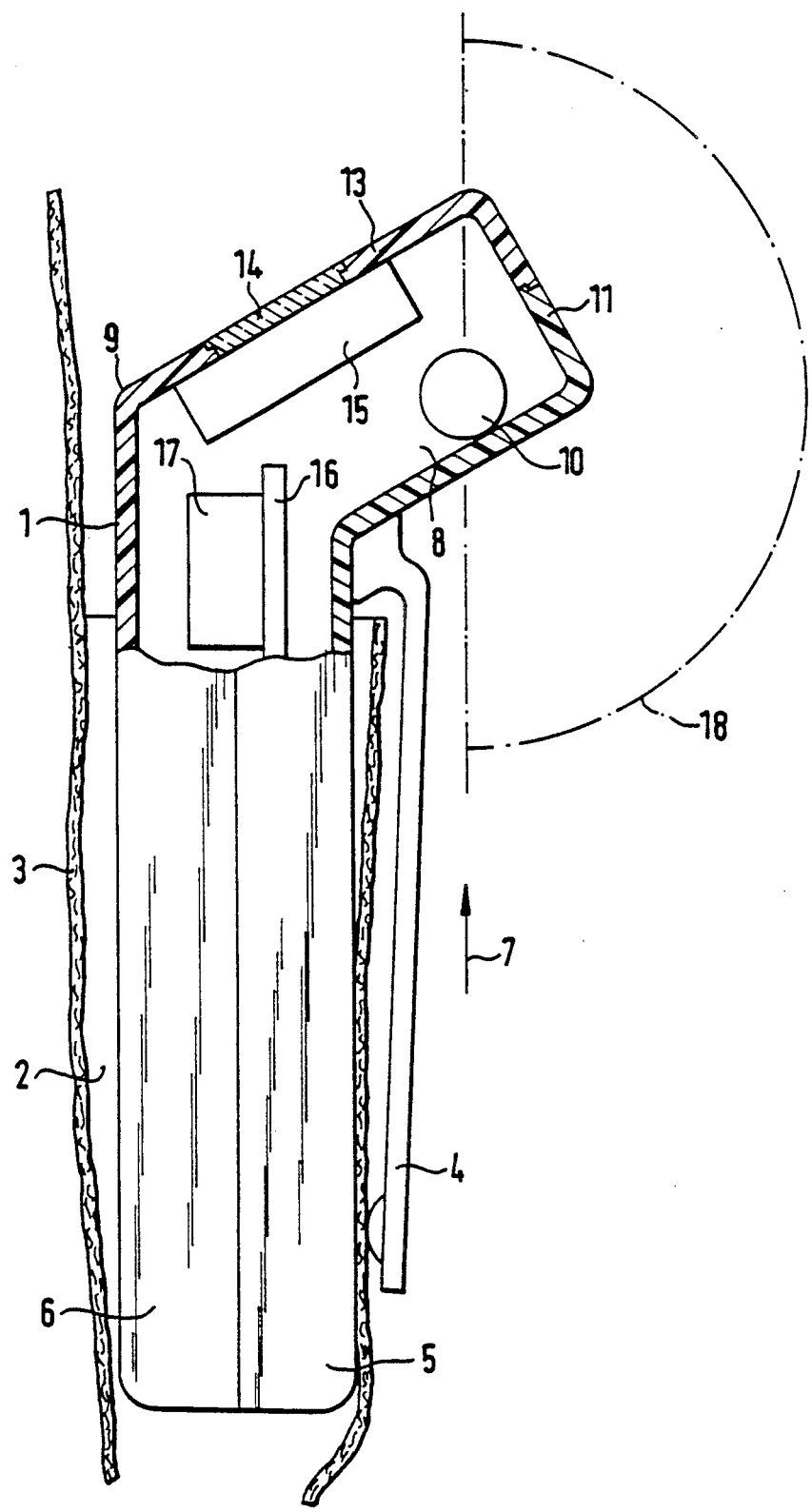

POCKET MEASURING INSTRUMENT FOR MEASURING IONIZING RADIATION

The invention relates to a pocket measuring instrument which can be carried in the pocket of a garment, for measuring ionizing radiation acting on person, and more particularly to an instrument having a housing in which a radiation detector is accommodated and in which a visually readable display unit is mounted in a wall facing in a direction to be readable by the person.

A conventional measuring instrument of this type is rectangular in shape, and can additionally be secured to the pocket of the garment in question by means of a clip; it contains on a front wall protruding from the pocket a display unit for displaying the ionizing radiation acting on the radiation measuring instrument and thus on the person carrying the measuring instrument. The radiation detector, which converts the intensity of the ionizing radiation acting on it into a corresponding electrical variable, is, in a measuring instrument of the conventional type, located between the display unit on the one hand and the electrical and mechanical components inside the housing of the measuring instrument on the other hand. These components, however, screen out the ionizing radiation acting on the measuring instrument on its way towards the radiation detector to such a varying degree that the sensitivity of the radiation measuring instrument for an ionizing radiation acting on the instrument out of a spatial hemisphere located in front of the measuring instrument is markedly dependent on the direction involved. In particular, radiation from the upper or lower peripheral area of the spatial hemisphere are screened considerably, so that for this radiation the radiation detector generates a measured value which is far too small for the actual intensity of the radiation concerned.

It frequently happens that persons work in a radiation-hazard room at a workbench or similar on which radiation sources are located, especially at the bottom peripheral area of the spatial hemisphere. Since the radiation measuring instrument carried by the person detects these radiation sources only in attenuated form, the danger exists that this person has been exposed to a much greater amount of radiation than is shown on the display of the measuring instrument.

The objective of the invention is accordingly to construct a measuring instrument of the type that can be carried in the pocket of a garment for measuring ionizing radiation acting upon the person. The measuring instrument is mounted in a housing in which a radiation detector is accommodated, and in which a visually readable display unit is mounted in a wall of the housing which faces in a direction so that the display can be read by the person. The measuring instrument is constructed in such a way as to ensure that it measures the ionizing radiation acting on the measuring instrument from the spatial hemisphere located in front of the measuring instrument as far as possible independently of direction. This objective is attained by the invention by means of the constructional features wherein an elongated housing has a portion extending forward at a certain angle from the longitudinal direction of the elongated housing. The radiation detector is located in the area of a front wall of the portion, and a display unit is located in an upper wall of the portion between the radiation detector and the elongated housing.

Due to the fact that the radiation detector of a measuring instrument thus designed is located in the head of the angled housing part of the measuring instrument, the spatial hemisphere whose centre is formed by the radiation detector is located in front of the other components of the measuring instrument when the measuring instrument is in the carrying position, and the radiation detector is now only surrounded by the walls of the housing of the measuring instrument. These, however, given an approximately uniform wall thickness throughout the walls of the housing, as is usual, do not cause any direction-dependent reduction in the intensity of the ionizing radiation passing through the housing. In addition, housings of this type are usually manufactured from a material which attenuates ionizing radiation as little as possible.

The invention is explained in more detail below as exemplified by the version depicted in the only FIGURE of the drawing.

The housing (1) depicted in the drawing surrounds the components of a radiation measuring instrument, which measures the ionizing radiation acting on a person, and is therefore inserted in a pocket (2) of a garment (3) worn by this person, and which is additionally secured to this pocket by a clip (4). The housing (1) is manufactured out of two housing shells (5 and 6), which form the housing (1) of the measuring instrument (shown from the side in the drawing), which is elongated in the direction of carrying. In the upper area of the longitudinal direction (7) of the housing, the shape of the housing (1) is bent at a particular angle of the longitudinal direction, so that in this area it forms an angled housing part (8), which in the version shown here protrudes upwards at an angle from the clothing pocket (2). To facilitate understanding, this area of the housing is shown in the drawing opened up as far as beyond the angled bend (9) of the housing, so that diagrammatically depicted components of the radiation measuring instrument can be recognized.

The measuring instrument's radiation detector (10) required for radiation measurement, which when exposed to ionizing radiation generates electrical pulses with a pulse rate proportional to the radiation intensity, is located in the area of the front wall (11) inside the angled housing part (8) of the measuring instrument. Between this radiation detector (10) and the angled bend (9) of the housing (1), in the upper housing wall (13) of the angled housing part (8), a transparent window (14) is installed, behind which a display unit (15) is located for numerical display of the intensity measured by the radiation detector (10) for the ionizing radiation acting on the measuring instrument. Under this the diagram shows a circuit board (16) of the measuring instrument with a component (17), a sound source, for example.

The radiation detector (10) of the radiation measuring instrument is so excellently located due to its position near the front wall (11) of the angled housing part (8) that ionizing radiation from a spatial hemisphere (18) of the space in front of the radiation measuring instrument located in the centre of this spatial hemisphere (18) is not shadowed on its way to the radiation detector (10) by components (15, 17) and components (16) of the radiation measuring instrument. This avoids a direction-dependent loss in sensitivity for the intensity measurement by the radiation detector (17).

I claim:

1. An instrument, which can be carried in the pocket of a garment, for measuring ionizing radiation acting upon a person wearing the garment, said instrument comprising:

a longitudinally extending housing portion adapted to fit in a pocket;

a forwardly projecting housing portion attached to the longitudinally extending housing portion and extending forwardly at a predetermined angle from the longitudinally extending housing portion in a direction away from the person;

a radiation detector located in a forwardmost portion of the forwardly projecting housing portion;

a display unit mounted in an upwardly facing wall of one of said housing portions and facing in a direction to be readable by the person when the instrument is carried in the pocket of a garment worn by the person, whereby the radiation detector is positioned in a forwardmost location so as to receive radiation from a wide angle, unobstructed by the display unit or components in the housing.

2. An instrument as described in claim 1, wherein the forwardly projecting housing portion is disposed at an end of the longitudinally extending housing portion.

* * * * *

UNITED STATES PATENT AND TRADEMARK OFFICE
CERTIFICATE OF CORRECTION

PATENT NO. : 4,996,429
DATED : February 26, 1991
INVENTOR(S) : Günter Werthmann

It is certified that error appears in the above-identified patent and that said Letters Patent is hereby corrected as shown below:

At page 1, line 2, please delete 'Günter' and insert --Werthmann--; and at line 5, please delete 'Werthmann Günter' and insert --Günter Werthmann--.

Signed and Sealed this

Thirtieth Day of June, 1992

*Attest:*

DOUGLAS B. COMER

*Attesting Officer*   *Acting Commissioner of Patents and Trademarks*